(12) United States Patent
Katsuyama (10) Patent No.: US 10,799,009 B2
(45) Date of Patent: Oct. 13, 2020

(54) APPLICATION CONTROL DEVICE, APPLICATION DEVICE, APPLICATION CONTROL METHOD AND STORAGE MEDIUM

(71) Applicant: SHISEIDO COMPANY, LTD., Chuo-ku, Tokyo (JP)

(72) Inventor: Tomoyuki Katsuyama, Kanagawa (JP)

(73) Assignee: Shiseido Company, Ltd., Tokyo (JP)

( * ) Notice: Subject to any disclaimer, the term of this patent is extended or adjusted under 35 U.S.C. 154(b) by 0 days.

(21) Appl. No.: 16/470,406

(22) PCT Filed: Dec. 18, 2017

(86) PCT No.: PCT/JP2017/045303
§ 371 (c)(1),
(2) Date: Jun. 17, 2019

(87) PCT Pub. No.: WO2018/117022
PCT Pub. Date: Jun. 28, 2018

(65) Prior Publication Data
US 2019/0307231 A1    Oct. 10, 2019

(30) Foreign Application Priority Data

Dec. 20, 2016    (JP) .................... 2016-246656

(51) Int. Cl.
*G06K 15/22*    (2006.01)
*A45D 44/00*    (2006.01)
*G06T 7/73*    (2017.01)
*A45D 34/04*    (2006.01)

(52) U.S. Cl.
CPC ............. *A45D 44/00* (2013.01); *A45D 34/04* (2013.01); *G06T 7/74* (2017.01); *G06T 2207/20021* (2013.01); *G06T 2207/30196* (2013.01)

(58) Field of Classification Search
None
See application file for complete search history.

(56) References Cited

U.S. PATENT DOCUMENTS

| 8,805,006 | B2 * | 8/2014 | Ishioka | ................ G06K 9/2018 |
| | | | | 382/103 |
| 2004/0078278 | A1 * | 4/2004 | Dauga | .................. A61B 5/0059 |
| | | | | 434/100 |
| 2007/0206881 | A1 * | 9/2007 | Ashikaga | ........... G06K 9/00463 |
| | | | | 382/294 |
| 2015/0078627 | A1 * | 3/2015 | Fukase | .................... G06T 7/001 |
| | | | | 382/112 |

(Continued)

FOREIGN PATENT DOCUMENTS

JP    2006-271654 A    10/2006
JP    2006271654 A  * 10/2006

(Continued)

*Primary Examiner* — Ted W Barnes
(74) *Attorney, Agent, or Firm* — Foley & Lardner LLP (57) ABSTRACT

An application control device according to an embodiment of the present invention has a storage unit that stores a first image of a predetermined range of a skin; an acquisition unit that acquires a second image of the skin having a smaller range than the first image from an image capture unit coupled to an application head configured to apply cosmetics to the skin; and a recognition unit that recognizes a position of the second image in the first image.

18 Claims, 9 Drawing Sheets

(56) References Cited

U.S. PATENT DOCUMENTS

| | | | |
|---|---|---|---|
| 2016/0066798 A1* | 3/2016 | Wang | A61B 5/4866 600/425 |
| 2016/0259034 A1* | 9/2016 | Imagawa | G01S 17/46 |
| 2016/0262624 A1* | 9/2016 | Nakajima | A61B 5/742 |
| 2017/0140516 A1* | 5/2017 | Maher | G06K 9/6212 |
| 2019/0117147 A1* | 4/2019 | Kikuchi | A61B 5/107 |

FOREIGN PATENT DOCUMENTS

| | | | | |
|---|---|---|---|---|
| JP | 2008-234362 A | | 10/2008 | |
| JP | 2008234362 A | * | 10/2008 | |
| JP | 2015-159975 A | | 9/2015 | |
| JP | 2015159975 A | * | 9/2015 | |
| JP | 2016-127333 A | | 7/2016 | |
| JP | 2016-166853 A | | 9/2016 | |
| WO | WO 2016/103607 A1 | | 6/2016 | |
| WO | WO-2016103607 A1 | * | 6/2016 | G06K 9/00771 |

* cited by examiner

APPLICATION CONTROL DEVICE, APPLICATION DEVICE, APPLICATION CONTROL METHOD AND STORAGE MEDIUM

CROSS-REFERENCE TO RELATED APPLICATIONS

This application is the U.S. National Stage of PCT/JP2017/045303, filed Dec. 18, 2017, which claims priority to JP 2016-246656, filed Dec. 20, 2016.

TECHNICAL FIELD

The present invention relates to an application control device, an application device, an application control method, and a storage medium.

BACKGROUND ART

For application of cosmetics to a skin, a technique of automatically performing application by using a printing device such as an ink-jet instead of using a finger, a sponge, or the like is known. Patent literature 1 discloses a makeup device including a head that ejects a cosmetic ink and a motion device that can move the head. The makeup device of Patent Literature 1 measures data such as unevenness, a brightness distribution, or the like of the makeup surface (skin) and determines a position of an age spot, a wrinkle, or the like on the makeup surface based on the data.

CITATION LIST

Patent Literature

PTL 1: Japanese Patent Application Laid-Open No. 2006-271654

SUMMARY OF INVENTION

Technical Problem

However, Patent Literature 1 does not specifically disclose a method of positioning the head on an application target such as an age spot, a wrinkle, or the like. While the motion device of Patent Literature 1 can move the head along the skin, it is required to know where the head is located on the skin in order to perform positioning.

The present invention has been made in view of the problems described above and intends to provide an application control device, an application device, an application control method, and a storage medium that can recognize a position of an application head on the skin.

Solution to Problem

An application control device according to an embodiment of the present invention has a storage unit that stores a first image of a predetermined range of a skin; an acquisition unit that acquires a second image of the skin having a smaller range than the first image from an image capture unit coupled to an application head configured to apply cosmetics to the skin; and a recognition unit that recognizes a position of the second image in the first image.

An application control method according to an embodiment of the present invention includes steps of storing a first image of a predetermined range of a skin; acquiring a second image of the skin having a range smaller than the first image from an image capture unit coupled to an application head configured to apply cosmetics to the skin; and recognizing a position of the second image in the first image.

A storage medium according to an embodiment of the present invention stores a program that causes a computer to perform storing a first image of a predetermined range of a skin; acquiring a second image of the skin having a smaller range than the first image from an image capture unit coupled to an application head configured to apply cosmetics to the skin; and recognizing a position of the second image in the first image.

Advantageous Effects of Invention

According to the present invention, an application control device, an application device, an application control method, and a storage medium that can recognize a position of an application head on the skin are provided.

DESCRIPTION OF EMBODIMENTS

First Embodiment

Figure 1:
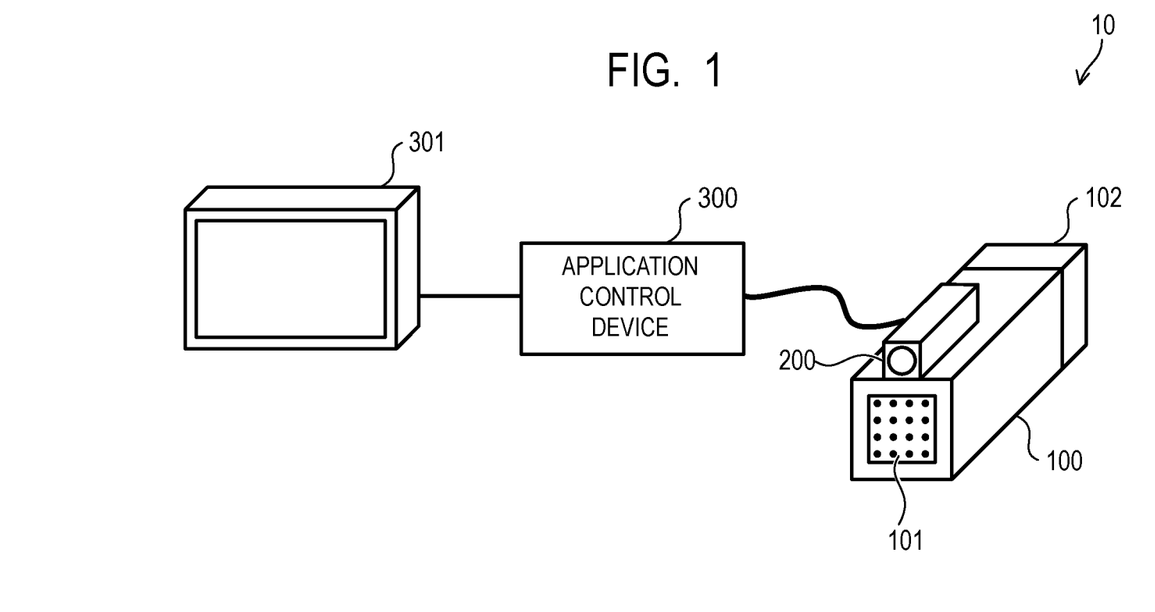
FIG. 1 is a schematic diagram illustrating a configuration of an application system according to a first embodiment.

FIG. 1 is a schematic diagram illustrating the configuration of an application system 10 according to the present embodiment. The application system 10 has an application device 100, an image capture unit 200, and an application control device 300. The application device 100 is a device for applying cosmetics (cosmetic material) to a skin and is held by a user. The application device 100 has a prismatic casing, and an application head 101 is provided on one end surface of the casing. The shape of the application device 100 is not limited thereto as long as the shape is easily held by the user and may be cylindrical or hemispherical. Further, the application device 100 may have a holding member such as a handle.

The application head 101 is formed of an ink-jet head, for example, and has a plurality of nozzles for ejecting the cosmetic material. The plurality of nozzles are two-dimensionally arranged and can apply the cosmetic material to a predetermined region of the skin. A cosmetic material tank 102 is attached to the application device 100, and the cosmetic material is supplied from the cosmetic material tank 102 to the application head 101. The cosmetic material tank 102 may be provided inside the application device 100. Liquid concealer for concealing an age spot, a freckle, a skin pore, or the like on a skin can be used as a cosmetic material.

The image capture unit 200 is provided on the side face (top face) of the casing of the application device 100 in the same orientation as the application head 101. The image capture unit 200 has a lens, an image pickup device, or the like and can capture an image (second image) of a skin of a narrow range on which application is performed by the application head 101. The image capture unit 200 is coupled to the application head 101, and the relative position of the image capture unit 200 to the application head 101 is fixed. The image capture unit 200 may be integrally formed with the application head 101.

The application device 100 and the image capture unit 200 are controlled by the application control device 300. The application control device 300 is connected to the application device 100 and the image capture unit 200 via a wired connection component such as a Universal Serial Bus (USB) cable or via a wireless connection such as Bluetooth (registered trademark), Wi-Fi, or the like. The application control device 300 may be embedded in the application device 100. The application control device 300 pre-stores an image (first image) of a wide range of the skin including an age spot, a freckle, a skin pore, or the like that may be an application target. The application control device 300 can identify the position of the application head 101 on the skin by comparing the second image acquired from the image capture unit 200 with the first image. The application control device 300 has a display 301, and the display 301 displays various information such as an image of the skin, the status of the application head 101, or the like.

When the user holds the application device 100 and brings the application head 101 close to the skin, the application control device 300 recognizes the position of the application head 101 on the skin and displays the current position of the application head 101 on the display 301. The user moves the application head 101 along the skin while checking the display 301, and the application head 101 automatically starts application of a cosmetic material when reaching a position at which an application target is present.

Figure 2:
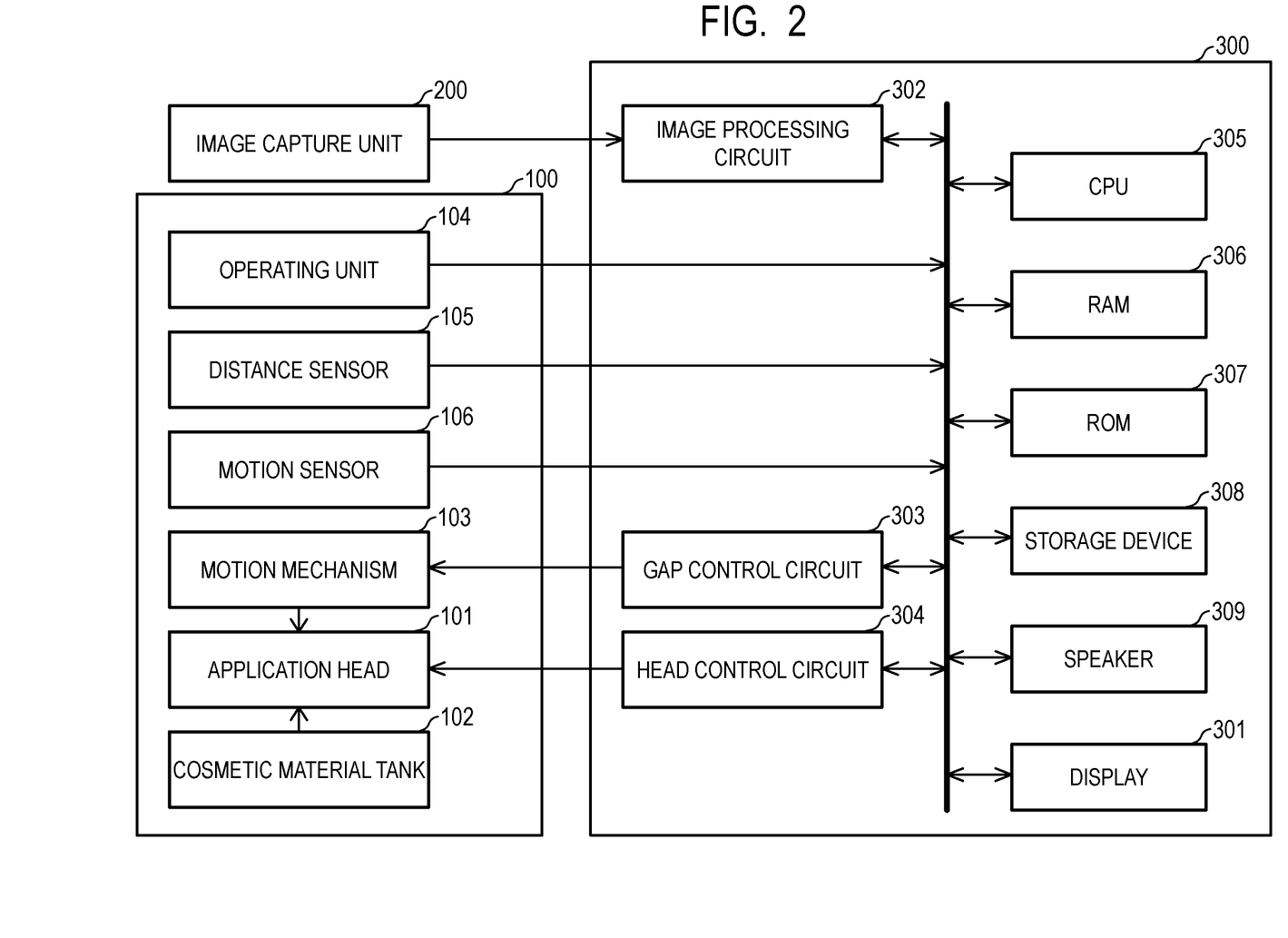
FIG. 2 is a block diagram of an application device and an application control device according to the first embodiment.

FIG. 2 is a block diagram of the application device 100 and the application control device 300 according to the present embodiment. The application device 100 has the application head 101, the cosmetic material tank 102, a motion mechanism 103, an operating unit 104, a distance sensor 105, and a motion sensor 106. The application control device 300 has the display 301, an image processing circuit 302, a gap control circuit 303, a head control circuit 304, a CPU 305, a RAM 306, a ROM 307, a storage device 308, and a speaker 309.

The application head 101 is a piezoelectric ink-jet head, for example, and is formed of a nozzle, a pressure chamber, a piezoelectric element, a drive circuit, or the like. The pressure chamber is filled with a cosmetic material, and when a voltage is applied from a drive circuit to a piezoelectric element, the volume of the pressure chamber changes due to deformation of the piezoelectric element. Thereby, the cosmetic material is ejected in a form of droplets from the nozzle. Note that the application head 101 may be a thermal ink-jet head that heats a cosmetic material by a heating member and ejects the cosmetic material by the pressure of generated bubbles. The application head 101 operates based on a control signal from the head control circuit 304.

The cosmetic material tank 102 contains a cosmetic material and supplies the cosmetic material to the application head 101. The cosmetic material tank 102 may be a cartridge type container that is easy to be replaced. The cosmetic material is a liquid having a predetermined viscosity that enables ejection from the application head 101 and may include concealer, foundation, blush, face powder, eyeshadow, or the like. A plurality of cosmetic material tanks 102 may be provided so as to contain a plurality of cosmetic materials of different types or color tones. For example, four cosmetic material tanks 102 are provided so as to be able to apply cosmetic materials of four colors, and a group of four nozzles corresponding to respective colors can be provided on the application head 101.

The motion mechanism 103 is formed of an actuator, a guide member, or the like and can drive the application head 101 forward and backward in the longitudinal direction of the application device 100, that is, in the direction perpendicular to a skin when the application head 101 faces the skin. The motion mechanism 103 performs the position control of the application head 101 in accordance with a control signal from the gap control circuit 303.

The operating unit 104 has an operating member such as a power switch, a menu button, an application button for performing application, or the like and is used by the user to provide an instruction to the application device 100. The application control device 300 controls the operation of the application device 100 in accordance with the instruction of the user input from the operating unit 104. The application button is preferably arranged at a position at which the user can easily operate while holding the application device 100 and is arranged at a position touched by a finger of the user when the user holds the application device 100, for example. Thereby, even when the user moves the application device 100 to a portion which cannot be directly viewed (such as a cheek), the user can operate the application button by groping.

The distance sensor 105 is an infrared sensor, an ultrasonic sensor, or the like, for example, emits a detection wave such as an infrared ray, an ultrasonic wave, or the like to an object, and receives the reflected wave. The distance sensor 105 can detect the distance to an object based on a time period from emission of a detection wave to reception of the reflected wave. Further, a plurality of distance sensors 105 are provided in the periphery of the application head 101, and it is also possible to detect the inclination of the application head 101 relative to the skin. The application control device 300 maintains a constant distance between the skin and the application head 101 based on a detection signal from the distance sensor 105, and it is also possible to control the application head 101 so as not to eject the cosmetic material when the application head 101 is inclined with respect to the skin, for example.

The motion sensor 106 includes an acceleration sensor, a gyro sensor, or a geomagnetic sensor and detects motion of the application head 101 such as movement, rotation, or the like. The acceleration sensor is formed of a capacitance detection element, for example, and can detect an acceleration applied to the application head 101. The gyro sensor is formed of a piezoelectric vibration element, for example, and has a function to detect the orientation of the application head 101. The geomagnetic sensor can identify the orientation of the application head 101 by detecting the geomagnetism. Based on the detection signal from the motion sensor 106, the application control device 300 can control the application head 101 so as not to eject the cosmetic material when the application head 101 is moving fast, for example.

The image capture unit 200 has an optical system, an image pickup device, and an analog-to-digital (A/D) converter. The optical system has an optical filter, a fixed lens, and a focus lens and forms a subject image by focusing a light from a subject (skin) on an imaging surface of the image pickup device. A polarization filter can be attached to the optical system, and the specular reflection can be reduced. The image pickup device is a Complementary Metal Oxide Semiconductor (CMOS) image sensor or a Charge Coupled Device (CCD) image sensor, for example, and has a plurality of two dimensionally arranged pixels, color filters, and micro-lenses. A plurality of pixels may include pixels for image capturing or pixels for focus detection. Further, the image pickup device has an electronic shutter function to control a charge accumulation time period. Each of the plurality of pixels outputs a pixel signal based on an incident light from the optical system. The A/D converter is formed of a comparison circuit, a latch circuit, or the like and converts an analog pixel signal from the image pickup device into digital RAW data. The image capture unit 200 can output a moving image of a predetermined frame rate in addition to a static image.

The display 301 is formed of a liquid crystal display or an organic Electro Luminescence (EL) display, for example. The display 301 performs various display such as an image from the image capture unit 200, an image stored in the storage device 308, status information on the application head 101, a menu screen, or the like based on data from the CPU 305. The display 301 may be a touchscreen and may also function as the operating unit 104.

The image processing circuit 302 includes a numerical operation circuit and performs a demosaicing process on the RAW data from the image capture unit 200 to generate image data (RGB image) having each color value of red (R), green (G), or blue (B) for each pixel. The image processing circuit 302 also has a function of performing digital image processing such as white balance adjustment, gamma correction, edge enhancement, gradation conversion, noise reduction, compression, or the like on the image data.

The gap control circuit 303 controls a spacing (gap) between the skin and the application head 101 by outputting a control signal to the motion mechanism 103. The gap control circuit 303 can control the position of the application head 101 so as to maintain a constant distance from the skin based on a detection signal from the distance sensor 105. The head control circuit 304 outputs control signals indicating information on a nozzle used for ejecting a cosmetic material, an application amount, or the like to the application head 101 based on an instruction from the CPU 305.

The central processing unit (CPU) 305 has a CPU core, a cache memory, or the like and integrally controls each part of the application control device 300. The random access memory (RAM) 306 is a Dynamic RAM (DRAM), for example, and used for a work field of the CPU 305, a load field of a program, or the like. The RAM 306 temporarily stores data required for a process of the CPU 305, image data generated in the image processing circuit 302, image data read from the storage device 308, or the like. The read only memory (ROM) 307 is an Electrically Erasable Programmable ROM (EEPROM), for example, and stores various setting files, a basic program such as an operating system (OS), and a control program for controlling the operation of the application device 100.

The storage device (storage unit) 308 is a flash memory or a hard disk, for example, and stores RAW data from the image capture unit 200, image data generated in the image processing circuit 302, and the like. The storage device 308 can also store image data acquired by an external image pickup device. The storage device 308 may be a portable storage medium and may be formed so as to be removable from the application control device 300 via a memory card slot, a USB connector, or the like.

The speaker 309 has a piezoelectric vibration unit, a drive circuit, or the like and outputs a sound wave signal based on data from the CPU 305. The speaker 309 can play a voice message, a sound effect, or the like and is used to notify the user of the operating status of the application device 100, for example.

Figure 3:
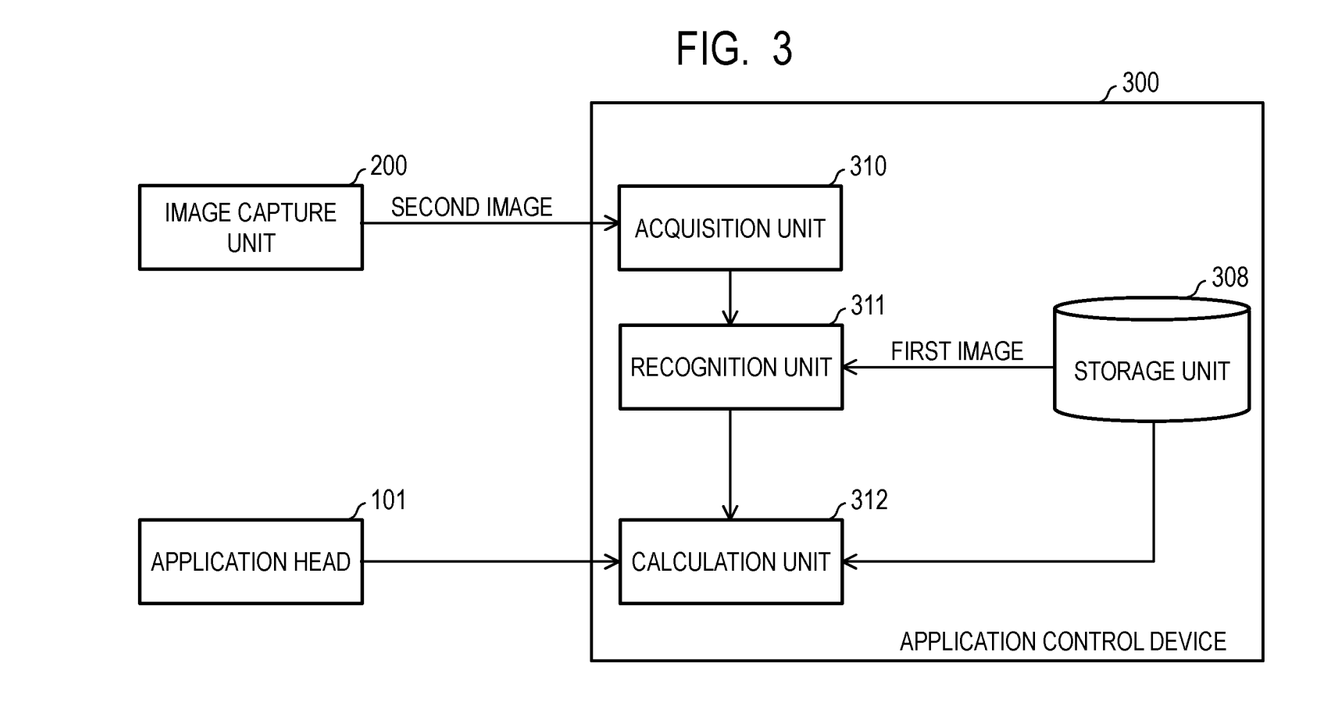
FIG. 3 is a function block diagram of the application control device according to the first embodiment.

FIG. 3 is a function block diagram of an application control device 300 according to the present embodiment. The application control device 300 has functions of the storage unit 308, an acquisition unit 310, a recognition unit 311, and a calculation unit 312. The function of the application control device 300 is implemented by the CPU 305 reading a predetermined control program stored in the ROM 307 to the RAM 306 and executing the control program.

The storage unit 308 stores the first image of a predetermined range on a skin. The first image is an image in which a wide range on the skin including an application target such as an age spot, a wrinkle, a skin pore, or the like is captured. The first image can be captured by using a dedicated imaging apparatus or a general digital camera and is pre-stored in the storage unit 308. The first image can also be captured by using the image capture unit 200.

The acquisition unit 310 acquires the second image from the image capture unit 200. The second image is an image of the skin having a smaller range than the first image. The acquisition unit 310 acquires the second image on a predetermined time period basis and transfers the second image to the recognition unit 311. The image capture unit 200 is coupled to the application head 101, and the position of the application head 101 can be obtained from the position of the image capture unit 200.

The recognition unit 311 compares the second image from the acquisition unit 310 with the first image stored in the storage unit 308 and recognizes the position of the second image in the first image. The recognition unit 311 can perform correlation calculation of image data and can extract a region having the highest correlation with the second image from the first image.

The calculation unit 312 divides the first image or the second image into a plurality of segments and calculates a required application amount of a cosmetic material for each segment. The calculation of an application amount may be performed in any method, for example, and it is possible to calculate an application amount such that an illuminance distribution of the skin after application has been performed is uniform. The application head 101 can apply cosmetics on the skin in accordance with the application amount from the calculation unit 312.

Figure 4:
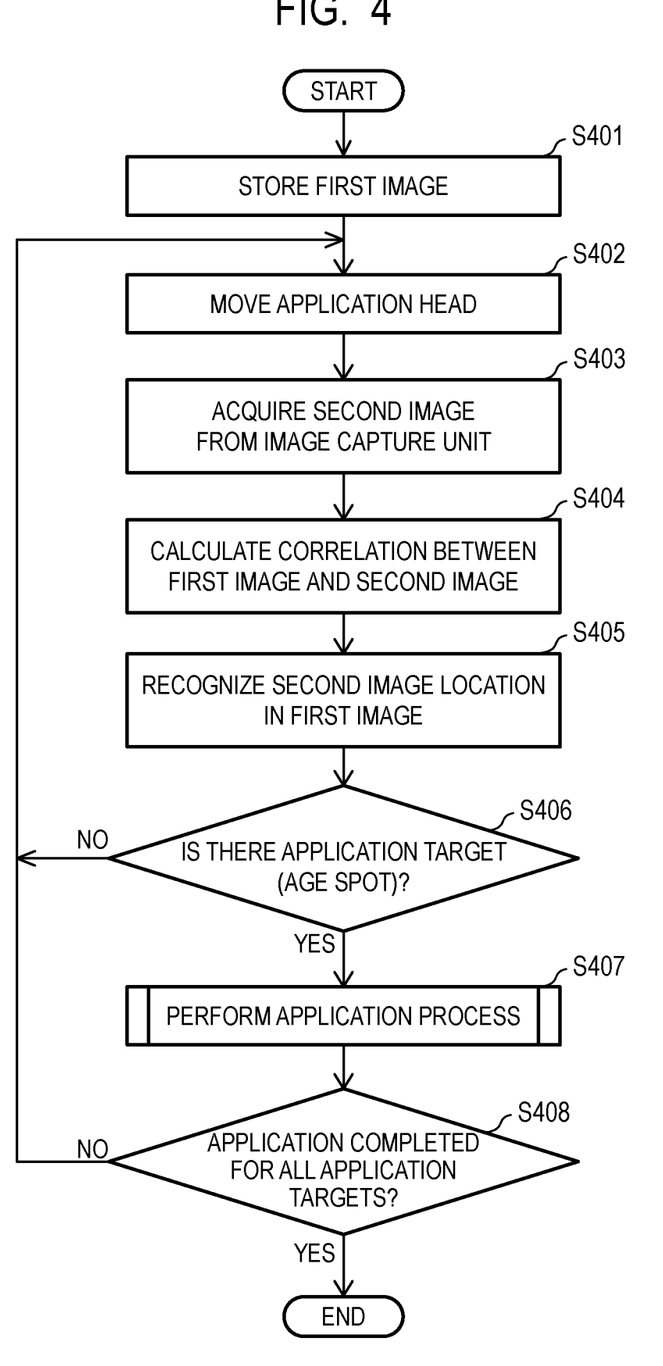
FIG. 4 is a flowchart illustrating an application control method according to the first embodiment.

FIG. 4 is a flowchart of an application control method according to the present embodiment. Here, an example of applying cosmetics to an age spot on the cheek will be described. First, the CPU 305 reads an image (first image) including a plurality of age spots from the storage unit 308 and stores the image in the RAM 306 (step S401). The first image is an image in which a wide range (for example, 3 cm in height×4 cm in width) of the cheek is captured. The first image may be captured by using a polarization filter. Further, the CPU 305 displays the first image on the display 301. The CPU 305 determines positions of a plurality of age spots from the first image and may display an icon or the like indicating the positions of the age spots to the user on the display 301. The positions of the age spots can be determined based on a feature amount (an illuminance distribution or the like) of the image, for example.

Next, the user holds the application device 100 and brings the application head 101 close to the skin. When the application head 101 has already been close to the skin, the user moves the application head 101 along the skin (step S402). The user can move the application head 101 in the direction in which an age spot is present while viewing the display 301. The image capture unit 200 captures a moving image of the skin at a predetermined frame rate.

The CPU 305 acquires the second image from the image capture unit 200 (step S403). The second image is a single frame of a moving image and is an image in which a narrow range (for example, 1 cm in height×1 cm in width) of the cheek is captured. In the same manner as with the first image, the second image may be captured by using a polarization filter. The CPU 305 generates image data on the second image in the image processing circuit 302 and stores the image data in the RAM 306. Note that the second image may be a single static image, and the data form of the second image is not particularly limited.

Next, the CPU 305 calculates a correlation between the first image and the second image (step S404). Specifically, the CPU 305 calculates a value of an evaluation function $F(\tau,\upsilon)$ expressed by Equation (1) below.

[Math 1]
$$F[\tau, \upsilon] = \int_X \int_M f[x, y]g[x-\tau, y-\upsilon]dxdy \qquad \text{Equation (1)}$$

Note that the method for calculating the correlation may be a method of examining the correlation for each pixel described below or a method of extracting a feature point and examining the correlation of feature amounts.

Figure 5:
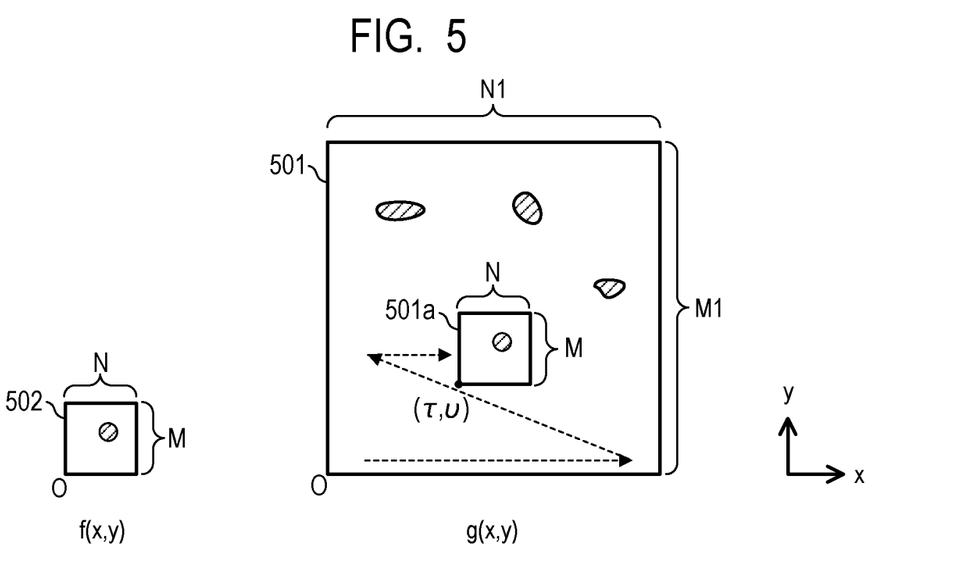
FIG. 5 is a diagram illustrating a correlation process according to the first embodiment.

As illustrated in FIG. 5, a value f(x,y) represents a pixel value at the coordinates (x,y) of the second image 502, and a value g(x,y) represents a pixel value at the coordinates (x,y) of the first image 501. The hatched portions represent age spots in the first image 501 and the second image 502.

The origins of the first image 501 and the second image 502 are set to a pixel at the lower left corner, respectively. The size of the second image 502 is M pixels in height by N pixels in width, and the size of the first image 501 is larger than the size of the second image 502 and M1 pixels in height by N1 pixels in width (M<M1 and N<N1). The parameters $\tau$ and $\upsilon$ represent a shift amount of a window region 501a in the first image. The window region 501a has the same size as the second image 502. By changing the values of the parameters $\tau$ and $\upsilon$, it is possible to scan the window region 501a within the first image 501. An evaluation function $F(\tau,\upsilon)$ corresponds to a product-sum operation of corresponding pixel values between the second image 502 and the window region 501a. The evaluation function $F(\tau,\upsilon)$ is not limited to Equation (1) and may be the sum of absolute values of differences for the corresponding pixel values, the sum of squares of pixel value differences, a correlation coefficient, or the like.

Note that an illuminance value of image data, each color value of an RGB image (R value, G value, and B value), a value obtained by appropriately weighting and adding respective color values, other value expressed in a color system other than RGB, or the like may be used as a pixel value. The correlation of an image is preferably calculated by using a specific wavelength component, for example, and a wavelength component shorter than or equal to 540 nm (B signal) is preferably used.

In step S404, the CPU 305 calculates the value of the evaluation function $F(\tau,\upsilon)$ while changing the parameters $\tau$ and $\upsilon$ in the range of $0 \leq \tau \leq (N1-N)$ and $0 \leq \upsilon \leq (M1-M)$, respectively. That is, the CPU 305 scans the entire region of the first image 501 while shifting the position of the window region 501a on a pixel basis in the vertical or horizontal direction and calculates the correlation between the second image 502 and the window region 501a.

Subsequently, the CPU 305 recognizes the position of the second image in the first image (step S405). The CPU 305 determines that there is a greater correlation when a larger value of the evaluation function $F(\tau,\upsilon)$ is obtained and recognizes the position of the window region 501a $(\tau,\upsilon)$ at which the value of the evaluation function $F(\tau,\upsilon)$ takes the maximum value as the position of the second image 502. The CPU 305 calculates the position of the application head 101 based on the position of the second image 502 and displays position information on the application head 101 on the display 301. The CPU 305 superimposes and displays, on the first image, a frame indicating a region on which the application head 101 can currently perform application, for example.

Next, the CPU 305 determines whether or not there is an application target (age spot) at the position of the application head 101 (step S406). For example, the CPU 305 references the position of an age spot determined in step S401 and determines whether or not the age spot is included in the region on which the application head 101 can currently perform application. If the CPU 305 determines there is no age spot at the position of the application head 101 (step S406, NO), the process returns to step S402 and stands by until the application head 101 is moved to another position by the user. If the CPU 305 determines there is an age spot at the position of the application head 101 (step S406, YES), the CPU 305 performs the application process in FIG. 6 (step S407). The CPU 305 may use the display 301 and the speaker 309 to inform the user that the application process is to be performed.

After performing the application process, the CPU 305 determines whether or not the application is completed for all of the application targets (step S408). That is, the CPU 305 determines whether or not the application process is performed for all of the age spots included in the first image. If the CPU 305 determines the application is not completed (step S408, NO), the process returns to step S402 and stands by until the application head 101 is moved to another position by the user. If the CPU 305 determines the application is completed (step S408, YES), the CPU 305 performs display on the display 301 indicating that the application is completed and ends the process.

Figure 6:
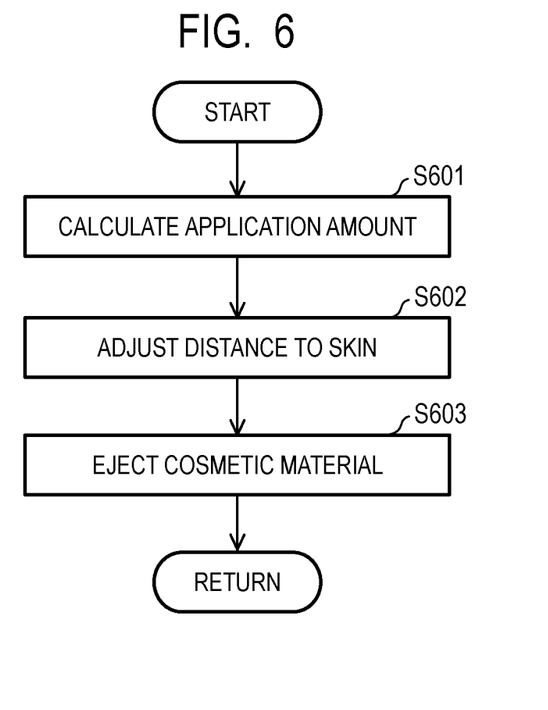
FIG. 6 is a flowchart illustrating details of the application process according to the first embodiment.

FIG. 6 is a flowchart illustrating details of the application process (step S407) according to the present embodiment. First, the CPU 305 calculates an application amount of a cosmetic material based on the second image acquired from the image capture unit 200 (step S601). For example, the CPU 305 calculates a required application amount for each of the plurality of segments obtained by dividing the second image. The segment can be a square pixel block formed of a plurality of pixels, and the CPU 305 calculates an application amount individually on a segment basis. The CPU 305 may calculate an application amount for a target segment based on a plurality of segments including the target segment and the peripheral segments thereof. Note that the application amount of a cosmetic material may be calculated based on the first image in step S401 of FIG. 4. In the same manner as with the second image, the CPU 305 can calculate a required application amount for each of the plurality of segments obtained by dividing the first image.

Subsequently, the CPU 305 adjusts the distance between the application head 101 and the skin (step S602). That is, the CPU 305 outputs a control signal based on a value detected by the distance sensor 105 to the motion mechanism 103 via the gap control circuit 303. The motion mechanism 103 moves the application head 101 forward and backward, and thereby the gap with the skin is kept constant. When the size of the gap exceeds the adjustable range of the motion mechanism 103, the CPU 305 may instruct the user to move the application head 101 closer to or slightly away from the skin by using the display 301, the speaker 309, or the like. Note that the gap adjustment process (step S602) may be performed in parallel with the application amount calculation process (step S601) described above.

Next, the CPU 305 causes the application head 101 to eject the cosmetic material (step S603). That is, the CPU 305 outputs a control signal of identification information of a nozzle that performs ejection, the application amount to the application head 101, or the like via the head control circuit 304. The application head 101 ejects the cosmetic material from the nozzle in accordance with the control signal from the head control circuit 304. Note that the CPU 305 may allow the ejection of the cosmetic material only when the user issues an execution instruction. For example, the CPU 305 performs the cosmetic material ejection process (step S603) when the application button is operated by the user, and when the application button is not operated for a predetermined time period, the process may return to the flowchart in FIG. 4 without performing the cosmetic material ejection process.

Further, the CPU 305 may acquire status information such as a motion, an attitude, or the like of the application head 101 based on a detection signal from the distance sensor 105 or the motion sensor 106. The CPU 305 can control the ejection timing based on status information on the application head 101. When the amount of shaking by the hand or the inclination to the skin of the application head 101 exceeds the predetermined range, for example, the CPU 305 uses the display 301 or the speaker 309 to warn the user and delays the ejection timing until the application head 101 returns to an appropriate attitude to the skin.

According to the present embodiment, by comparing the second image acquired from the image capture unit 200 coupled to the application head 101 to the first image in which the whole skin including the application target is captured, the position of the application head 101 on the whole skin can be accurately recognized. Thereby, the position relationship between the application head and the application target on the skin becomes clear, and the user can guide the application head 101 to the application target without indecision.

Further, while being obtained by capturing the same portion of the skin in different sizes, the first image and the second image are different in not only the size but also the timing of capturing, a degree of skin swelling, a skin tone, a degree of inclusion of specular reflection, or the like. Thus, while it may be difficult to detect the position of the second image in the first image by simply matching the images, it is possible to accurately detect the position of the second image in the first image by using the correlation between the first image and the second image according to the present embodiment.

Second Embodiment

Subsequently, an application device 700 according to a second embodiment of the present invention will be described. Since the application device 700 according to the present embodiment is formed in the same manner as the application device 100 according to the first embodiment, a difference from the first embodiment will be mainly described.

Figure 7A:
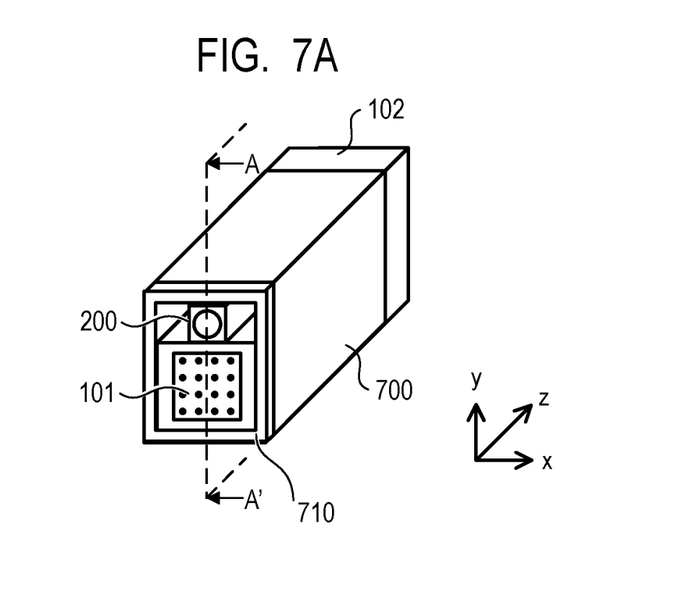
FIG. 7A is a schematic diagram illustrating an external view of the application device according to a second embodiment.
Figure 7B:
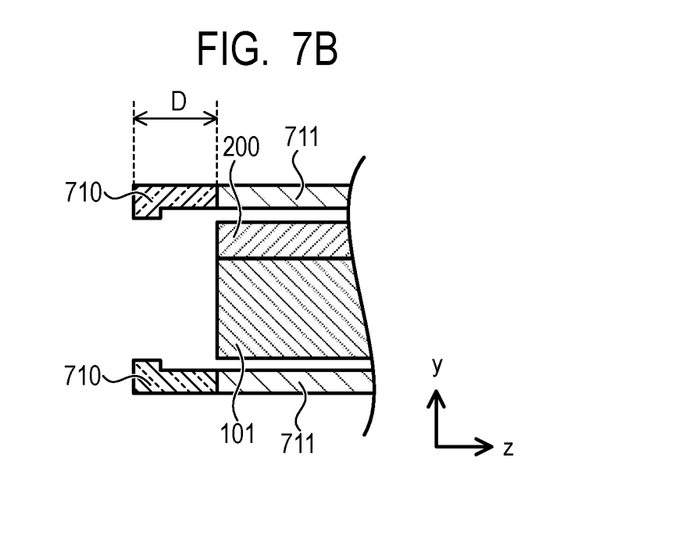
FIG. 7B is a sectional view of the application device according to the second embodiment.

FIG. 7A is a schematic diagram illustrating the external view of the application device 700, and FIG. 7B is a sectional view of the FIG. 7A taken along the line A-A'. The application device 700 has a guide member (holding portion) 710 on an end surface on which the application head 101 and the image capture unit 200 are provided (hereinafter, referred to as a head surface). The guide member 710 has a square column shape with a hollow inside and is formed of a transparent or translucent synthetic resin or the like. The guide member 710 is arranged along the edge of the head surface and fixed to a casing 711 of the application device 700. The tip portion of the guide member 710 is bent inward so as to easily press the skin. The user holds the application device 700 and slightly presses the tip portion of the guide member 710 onto the skin. The application head 101 is held so at to maintain a constant distance D to the skin in the z-axis direction by using the guide member 710.

According to the present embodiment, since the guide member 710 is provided on the head surface of the application device 700, it is not required to adjust the gap by using the motion mechanism 103. Further, by pressing the guide member 710, the swelling of the skin can be suppressed, and the flatness of the skin can be enhanced. It is therefore possible to improve accuracy of application performed by the application head 101.

Third Embodiment

Figure 8:
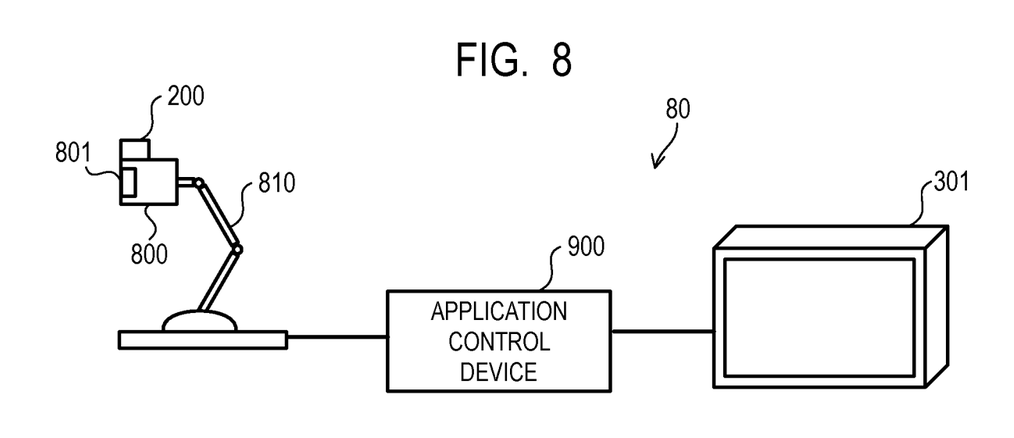
FIG. 8 is a schematic diagram illustrating a configuration of an application system according to a third embodiment.

Subsequently, an application system 80 according to a third embodiment of the present invention will be described. FIG. 8 is a schematic diagram illustrating the configuration of the application system 80. The application system 80 according to the present embodiment has an application device 800, the image capture unit 200, and an application control device 900. The application device 800 has an application head 801 and a robot arm 810, and the image capture unit 200 is coupled to the application head 801. The application head 801 is attached to the tip of the robot arm 810.

The robot arm 810 is an articulated arm-type robot and can freely change the position and orientation of the application head 801 by changing the attitude of the arm. The robot arm 810 can move the application head 801 in any direction along the skin based on a drive command from the application control device 900, for example. The application control device 900 is connected to the robot arm 810, and the application control device 900 can control the operation of the robot arm 810 by using the drive command. The application control device 900 has the display 301, and various information such as an image of the skin, the status of the application head 801, or the like is displayed on the display 301.

Figure 9:
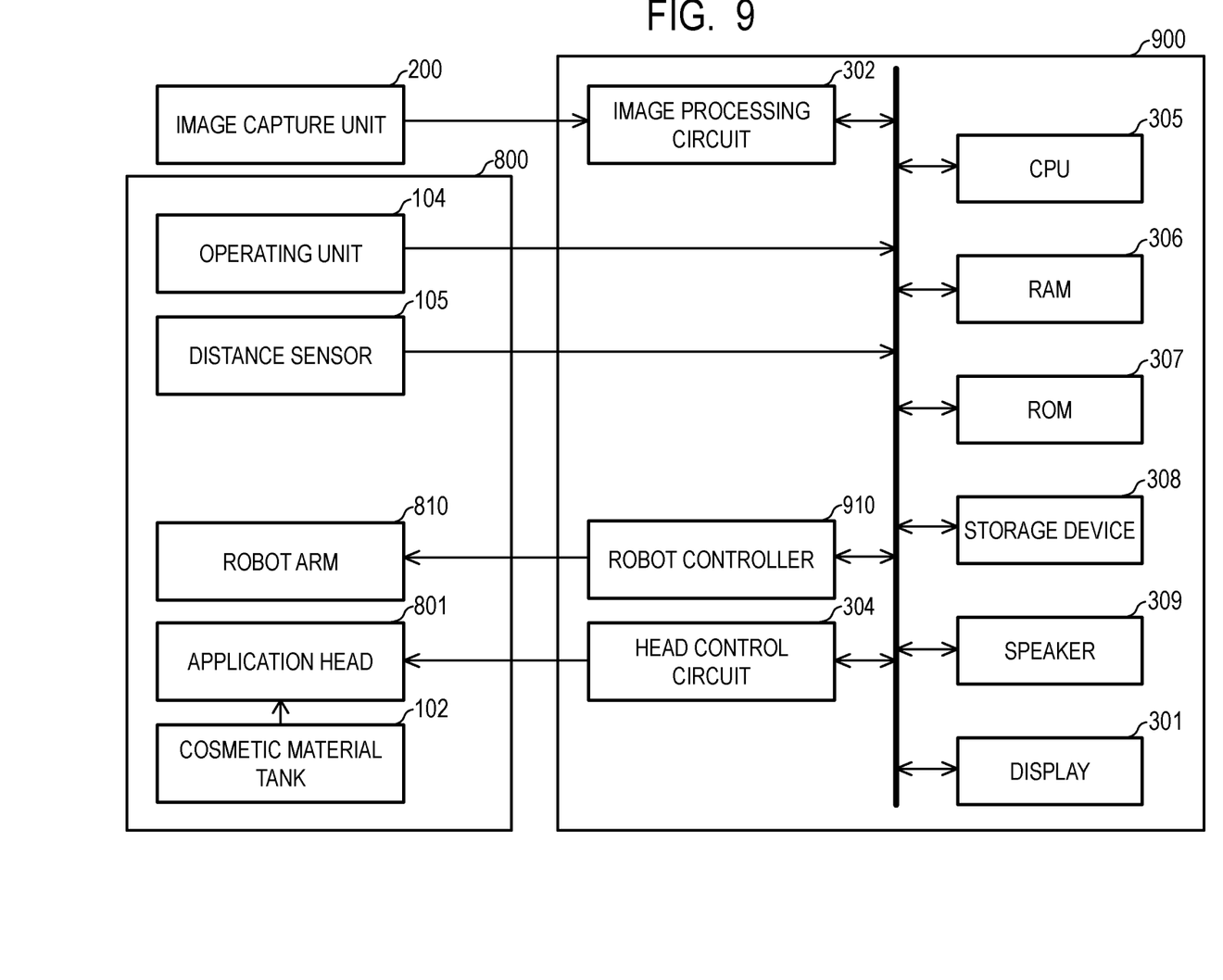
FIG. 9 is a block diagram of an application device and an application control device according to the third embodiment.

FIG. 9 is a block diagram of the application device 800 and the application control device 900 according to the present embodiment. The application device 800 has an application head 801, a robot arm 810, the cosmetic material tank 102, the operating unit 104, and the distance sensor 105. The application control device 900 has a robot controller 910, the display 301, the image processing circuit 302, the head control circuit 304, the CPU 305, the RAM 306, the ROM 307, the storage device 308, and the speaker 309.

While the application head 801 is formed in the same manner as the application head 101 according to the first embodiment, a plurality of nozzles are one-dimensionally aligned (for example, in a line shape) in the application head 801. The robot arm 810 can perform application of a cosmetic material by sweeping the application head 801 in a direction perpendicular to the direction in which a plurality of nozzles are arranged. The application device 800 may have a plurality of cosmetic material tanks 102 containing cosmetic materials of different color tones, and a line of a plurality of nozzles corresponding to respective colors may be provided to the application head 801. The robot controller 910 outputs, to the robot arm 810, a drive command generated based on an instruction from the CPU 305.

Since the cosmetic material tank 102, the operating unit 104, the distance sensor 105, the display 301, the image processing circuit 302, the head control circuit 304, the CPU 305, the RAM 306, the ROM 307, the storage device 308, and the speaker 309 are the same as those in the first embodiment, the description thereof will be omitted. Note that the operating unit 104 is preferably provided to a base supporting the robot arm 810, the display 301, or the like. Further, the shape of a skin associated with the first image may be pre-stored in the storage device 308 in a form of three-dimensional coordinates or the like. The robot controller 910 can control the robot arm 810 so as to hold the application head 801 at a constant distance from the skin based on the shape of the skin.

While the application control device 900 performs the same processes as that in the flowchart in FIG. 4, the present embodiment is different in that the robot arm 810 moves the application head 801 in step S402. That is, the CPU 305 determines the direction and distance to move the application head 101 based on the position of the second image in the first image recognized in step S405 and drives the robot arm 810 via the robot controller 910.

According to the present embodiment, the CPU 305 can recognize the position of the application head 810 on a skin and move the application head 801 to the position of an application target by using the robot arm 810. Even when the user moves during the application head 801 moving, the CPU 305 can recognize the position of the application head 801 in real time, and it is thus possible to correct a moving direction and a moving amount of the application head 801 immediately.

Another Embodiment

The present invention is not limited to the embodiments described above and can be changed and implemented within the scope not departing from the spirit of the present invention. When a correlation between the first image and the second image is calculated (step S404), for example, a feature point such as an age spot, a mole, a skin pore, or the like may be extracted from each image, and the correlation may be calculated for only the feature point. In such a way, it is possible to significantly reduce the calculation amount of the evaluation function $F(\tau,\upsilon)$.

Further, the control process of the embodiments described above may also be applied to a cosmetic device that works on a specific place on a skin such as injection of a medicinal agent by using a needle or a laser emission on a mole or the like on the skin.

REFERENCE SIGNS LIST

100 application device
101 application head
200 image capture unit
300 application control device
308 storage device (storage unit)
310 acquisition unit
311 recognition unit
312 calculation unit
501 first image
502 second image

The invention claimed is:

1. An application control device comprising:
   a storage unit that stores a first image of a predetermined range of a skin;
   an acquisition unit that acquires a second image of the skin having a smaller range than the first image from an image capture unit coupled to an application head configured to apply cosmetics to the skin; and
   a recognition unit that recognizes a position of the second image in the first image.

2. The application control device according to claim 1, wherein the recognition unit recognizes the position by extracting a region having the highest correlation with the second image from the first image.

3. The application control device according to claim 2, wherein the recognition unit calculates the correlation by using a specific wavelength component of the first image and the second image.

4. The application control device according to claim 3, wherein the specific wavelength component has a wavelength that is shorter than or equal to 540 nm.

5. The application control device according to claim 1, wherein the first image and the second image are captured by using a polarization filter.

6. The application control device according to claim 1, further comprising a calculation unit that divides the first image or the second image into a plurality of segments and calculates an application amount required for each of the segments,
   wherein the application head applies cosmetics in accordance with the application amount.

7. The application control device according to claim 1, further comprising a holding unit that holds the application head so as to maintain a constant distance to a skin.

8. The application control device according to claim 1, wherein the application head is an ink-jet head that ejects cosmetics in a form of droplets.

9. An application device comprising:
   the application head;
   the image capture unit; and
   the application control device according to claim 1.

10. An application control method comprising steps of:
    storing a first image of a predetermined range of a skin;
    acquiring a second image of the skin having a smaller range than the first image from an image capture unit coupled to an application head configured to apply cosmetics to the skin; and
    recognizing a position of the second image in the first image.

11. The application control method according to claim 10, wherein said recognizing comprises recognizing the position by extracting a region having the highest correlation with the second image from the first image.

12. The application control method according to claim 11, wherein the recognizing comprises calculating the correlation by using a specific wavelength component of the first image and the second image.

13. The application control method according to claim 12, wherein the specific wavelength component has a wavelength that is shorter than or equal to 540 nm.

14. The application control method according to claim 10, wherein the first image and the second image are captured by using a polarization filter.

15. The application control method according to claim 10, further comprising dividing the first image or the second image into a plurality of segments, and calculating an application amount required for each of the segments, wherein the application head applies cosmetics in accordance with the application amount.

16. The application control method according to claim 10, further comprising holding the application head so as to maintain a constant distance to a skin.

17. The application control method according to claim 10, wherein the application head is an ink-jet head that ejects cosmetics in a form of droplets.

18. A non-transitory storage medium that stores a program that causes a computer to perform:
   storing a first image of a predetermined range of a skin;
   acquiring a second image of the skin having a smaller range than the first image from an image capture unit coupled to an application head configured to apply cosmetics to the skin; and
   recognizing a position of the second image in the first image.

* * * * *